United States Patent

Sohn

[11] Patent Number: 6,065,368
[45] Date of Patent: May 23, 2000

[54] SELF-COMPENSATING DYNAMIC BALANCER

[75] Inventor: Jin-seung Sohn, Seoul, Rep. of Korea

[73] Assignee: Samsung Electronics Co., Ltd., Kyungki-do, Rep. of Korea

[21] Appl. No.: 09/207,610

[22] Filed: Dec. 9, 1998

[30] Foreign Application Priority Data

Dec. 16, 1997 [KR] Rep. of Korea ............... 97-69176

[51] Int. Cl.[7] .............. F16F 15/22; G05G 1/00; H05K 5/24; G11B 17/02
[52] U.S. Cl. .................. 74/573 R; 74/572; 310/51; 360/99.12; 188/267
[58] Field of Search ............... 74/572–574; 310/104, 310/208, 266, 51; 188/378, 267; 360/99, 12, 97.02, 98.07, 98.08, 99.04, 99.08

[56] References Cited

U.S. PATENT DOCUMENTS

| | | | |
|---|---|---|---|
| 1,293,697 | 2/1919 | Canfield . | |
| 1,678,555 | 7/1928 | Cabral . | |
| 2,366,562 | 1/1945 | Schug | 230/117 |
| 2,536,813 | 1/1951 | Jones et al. | 137/139 |
| 2,891,637 | 6/1959 | Cameron | 188/96 |
| 3,027,473 | 3/1962 | Bodge | 310/104 |
| 3,860,844 | 1/1975 | Hetzel | 310/104 |
| 4,843,270 | 6/1989 | Dijken | 310/208 |
| 5,311,092 | 5/1994 | Fisher | 310/266 |
| 5,682,069 | 10/1997 | Phillips et al. | 310/51 |
| 6,005,749 | 12/1999 | Ikuta et al. | 360/99.12 |

FOREIGN PATENT DOCUMENTS

| | | | |
|---|---|---|---|
| 6-14514 | 1/1994 | Japan | 310/51 |
| 10-83622 | 3/1998 | Japan | 74/572 |

*Primary Examiner*—Vinh T. Luong
*Attorney, Agent, or Firm*—Sughrue, Mion, Zinn, Macpeak & Seas, PLLC

[57] ABSTRACT

A self-compensating dynamic balancer restricts vibrations of moving members by regulating movements of the moving members when a main body does not rotate or rotates at a low speed below the natural frequency. The self-compensating dynamic balancer, coupled to a rotating body, includes a main body having a circular race formed around a rotation shaft of the rotating body. A magnet is inserted around the outer circumference of the inner wall of the race. Moving members, which have a plurality of non-magnetic rigid bodies and a plurality of magnetic rigid bodies, are movably disposed in the race. Each of the magnetic rigid bodies is disposed between the non-magnetic rigid bodies. A cover member is coupled to the main body to cover the race. Thus, since mutual magnetic effects between the moving members are removed, the internal vibrations generated due to an eccentric center of mass of the rotating body can be restricted.

3 Claims, 3 Drawing Sheets

SELF-COMPENSATING DYNAMIC BALANCER

BACKGROUND OF THE INVENTION

1. Field of the Invention

The present invention relates to a self-compensating dynamic balancer, and more particularly, to a self-compensating dynamic balancer which restricts vibrations of moving members by regulating movements of the moving members when a main body does not rotate or rotates at a low speed below the natural frequency.

2. Description of the Related Art

In general, a disk player records/reproduces information on/from an optical disk in a non-contact method. In the disk player, as the rotational speed of a spindle motor installed therein increases, internal vibrations may be generated. The internal vibrations are generated mainly due to the revolution of the rotation center of a rotating body, that is, whirling, which is caused by disparity between the rotation center and the center of mass of the rotating body. The eccentric mass of the rotating body is produced by an error in a manufacturing process of the rotating body such as a disk. Thus, a self-compensating dynamic balancer is adopted to reduce the internal vibrations.

FIG. 1 shows the structure of the conventional self-compensating dynamic balancer. Referring to the drawing, the conventional self-compensating dynamic balancer is installed at the bottom of a turntable 1 having a guide protrusion 1a. The guide protrusion 1a guides a disk (not shown) being placed onto the turntable 1 to an appropriate position. The self-compensating dynamic balancer includes a main body 3 in which a race 4 is formed, a magnet 6 coupled along the inner circumferential surface of the race 4, a plurality of moving members 5 placed in the race 4, and a cover member 7 coupled to the main body 3 from the top. Coupling holes 1b, 7a, and 3a into which a rotation shaft 9a of the spindle motor 9 inserts are formed at the centers of the turntable 1, the cover member 7, and the main body 3, respectively. Thus, the turntable 1 and the self-compensating dynamic balancer are rotated by a rotational force provided by the spindle motor 9.

The moving members 5 are magnetized balls such that, when the spindle motor 9 does not rotate or rotates at a low speed, they stick to the magnet 6 from the magnetic force. Here, the "low" speed means a case in which the centrifugal force applied to the self-compensating dynamic balancer by the spindle motor 9 is less than the magnetic force applied between the moving members 5 and the magnet 6.

The self-compensating dynamic balancer for a disk player having the above structure is coupled to the bottom of the turntable 1 and compensates for the internal vibrations due to the eccentric mass when the turntable 1 rotates at a speed beyond the natural frequency. Also, when the turntable 1 does not rotate or rotates at the low speed, the moving members 5 stick to the magnet 6 and do not generate internal noise. Further, when a disk player is installed vertically, the moving members 5 can easily overcome the pull of gravity.

However, in the self-compensating dynamic balancer for a disk player having the above structure, since a magnetic force is also generated between each of the moving members 5, a moving member for example 5a may stick to either a 5b or another neighboring moving member 5c, or to. Thus, the moving members 5 cannot be located at an accurate balancing position due to magnetic interference between the neighboring moving members, which results in inferior balancing performance.

SUMMARY OF THE INVENTION

To solve the above problem, it is an objective of the present invention to provide a self-compensating dynamic balancer having an improved structure so that movements of moving members are regulated utilizing a magnetic force and simultaneously a mutual magnetic force is not applied between neighboring moving members.

Accordingly, to achieve the above objective, there is provided a self-compensating dynamic balancer coupled to a rotating body to restrict internal vibrations due to an eccentric center of mass of the rotating body, which comprises: a main body having a circular race formed around a rotation shaft of the rotating body; a magnet inserted around the outer circumference of the inner wall of the race; moving members having a plurality of non-magnetic rigid bodies and a plurality of magnetic rigid bodies, movably disposed in the race, each of the magnetic rigid bodies being disposed between the non-magnetic rigid bodies; and a cover member coupled to the main body to cover the race, in which mutual magnetic effects between the moving members are removed.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
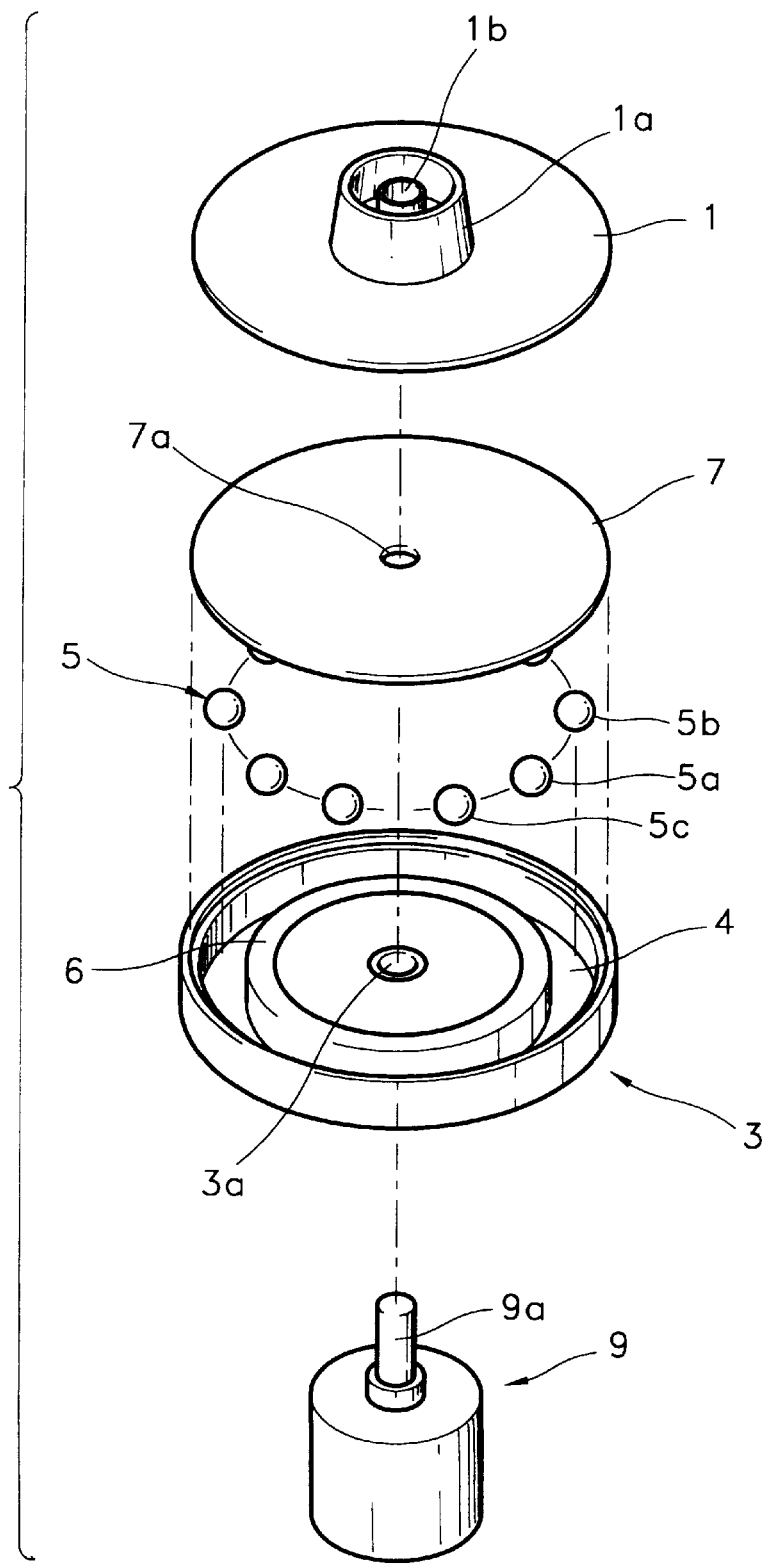
FIG. 1 is an exploded perspective view illustrating a conventional self-compensating dynamic balancer.
Figure 2:
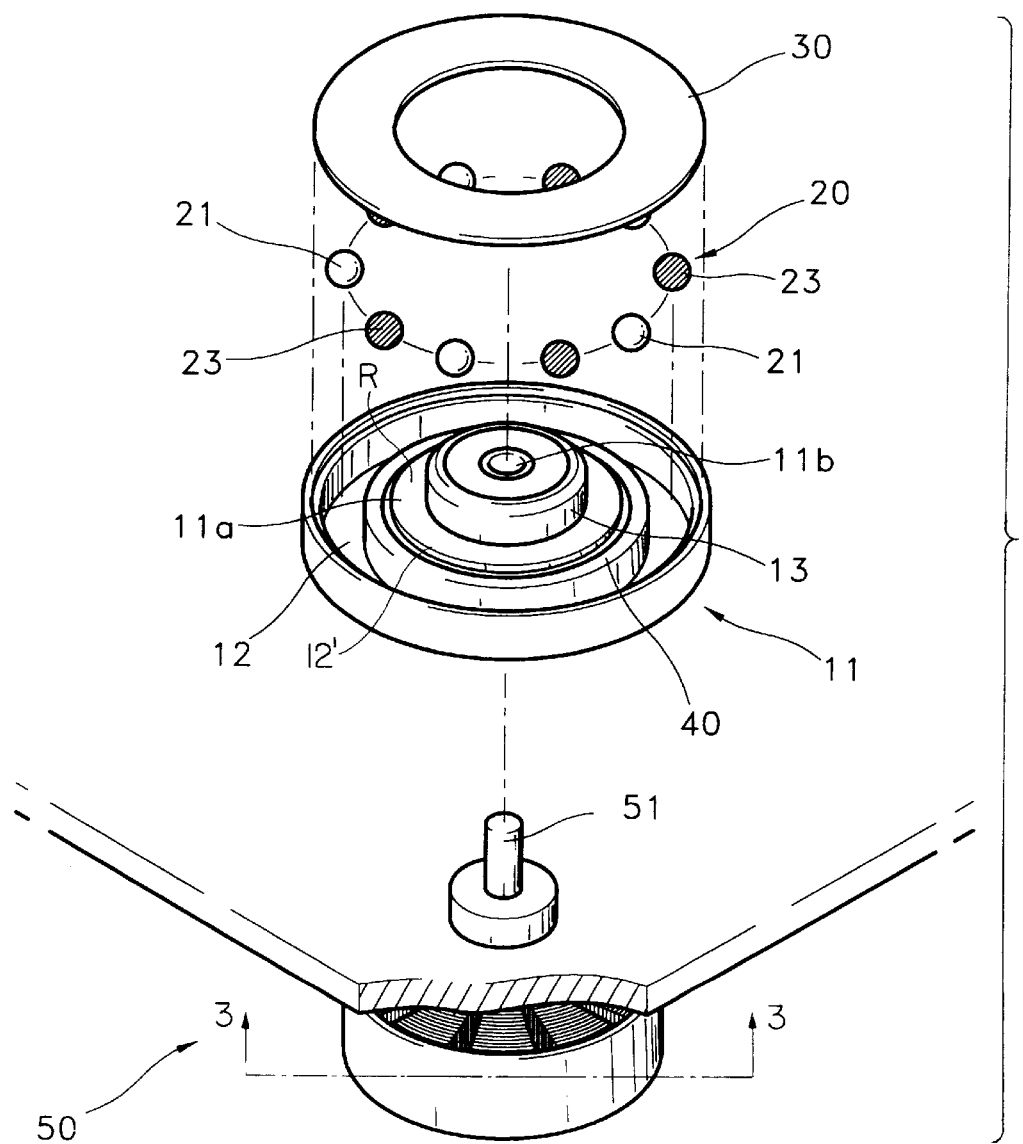
FIG. 2 is an exploded perspective view illustrating a self-compensating dynamic balancer according to a preferred embodiment of the present invention.
Figure 3:
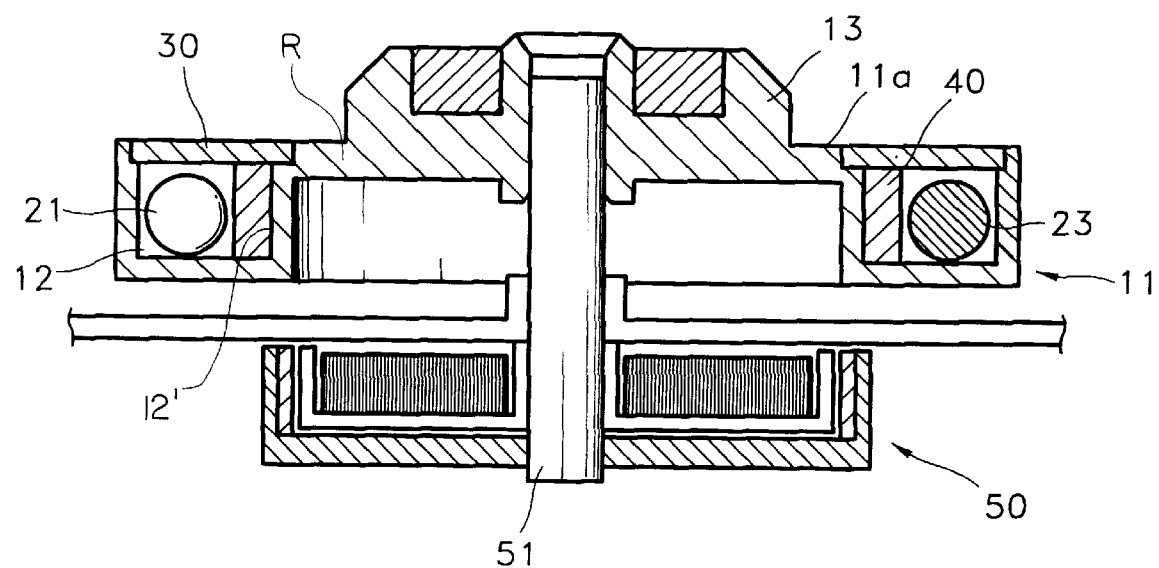
FIG. 3 is a sectional view along the lines 3—3 of the self-compensating dynamic balancer shown in FIG. 2.

FIGS. 2 and 3 show an example of a self-compensating dynamic balancer according to a preferred embodiment of the present invention, which is integrally formed with a rotating body R for a disk player, for example, a turntable.

As shown in the drawings, the self-compensating dynamic balancer includes a main body 11 having a circular race 12 formed therein, a magnet 40 inserted around the outer circumference of the inner wall 12 of the race 12, a plurality of moving members 20 provided inside the race 12 and being capable of movement, and a cover member 30 coupled to the main body 11 to cover the race 12.

The main body 11 has a disk accommodation portion 11a where an optical disk is placed and a guide protrusion 13 for guiding the disk placed at the center of the disk accommodation portion 11a. Also, a coupling hole 11b is formed at the center of the guide protrusion 13. The coupling hole 11b is coupled to a rotation shaft 51 of a spindle motor 50 which provides a rotational force. Thus, the main body 11 is rotated by the rotational force provided by the spindle motor 50.

The moving members 20 comprise a plurality of non-magnetic rigid bodies 21 and a plurality of magnetic rigid bodies 23. each being disposed between the non-magnetic rigid bodies 21.

The non-magnetic rigid bodies 21 are not attracted by the magnet 40 positioned in the race 12. The magnetic rigid bodies 23 stick to the magnet 40 when the main body 11 does not rotate or rotates at a low speed such that the centrifugal force generated is weaker than the magnetic force applied between the magnet 40 and the magnetic rigid bodies 23.

That is, the magnetic interference acting between the respective moving members 20 can be removed by alternately arranging the non-magnetic rigid bodies 21 and the magnetic rigid bodies 23 in the race 12. Thus, when the main body 11 rotates at a speed above the natural frequency thereof, since the centrifugal force is greater than the above-described magnetic force, the moving members 20 are detached from the magnet 40 and freely move in the race 12. Also, as the moving members 20 do not stick together, a normal balancing action can be performed. During a halted state or when rotating at a low speed, the magnetic rigid bodies 23 stick to the magnet 40 so that movements of the moving members 20 in the race 12 are regulated. Accordingly, generation of noise due to movement of the moving members 20 in the race 12 can be reduced. Also, when the main body 11 is installed vertically, the moving members 20 can easily overcome the pull of gravity.

Although the above self-compensating dynamic balancer is described as being formed integrally with a turntable, the self-compensating dynamic balancer can be formed integrally with or coupled to a rotating body installed to be capable of rotating.

As described above, the self-compensating dynamic balancer according to the present invention, by alternately arranging the magnetic rigid bodies and the non-magnetic rigid bodies in the race where the magnet is installed along the outer circumferential surface of the inner wall of the race, when the main body does not rotate or rotates at a low speed, movements of the moving members can be regulated by the mutual magnetic force applied between the magnetic rigid bodies and the magnet, so that noise can be reduced and eccentric rotation of a disk can be restricted. Also, since a negligible magnetic force is present between the magnetic rigid bodies and the non magnetic rigid bodies, when the main body rotates at a speed above the natural frequency, the magnetic interference between the neighboring moving members is removed so that an accurate balancing operation can be performed.

What is claimed is:

1. A self-compensating dynamic balancer coupled to a rotating body to restrict internal vibrations, said balancer comprising:
    a main body having a circular race which includes an inner wall and is formed around a rotation shaft of said rotating body;
    a magnet inserted around a circumference of the inner wall of said race;
    a plurality of moving members including a plurality of non-magnetic rigid bodies and a plurality of magnetic rigid bodies, movably disposed in said race, said magnetic rigid bodies and said non-magnetic rigid bodies being arranged in alternating fashion in said race, thereby removing mutual magnetic effects between said moving members; and
    a cover member coupled to said main body to cover said race.

2. A self-compensating dynamic balancer, said balancer comprising:
    a main body having a circular race formed around a rotation shaft;
    a magnet inserted around a wall of said race;
    a plurality of moving members including a plurality of non-magnetic rigid bodies and a plurality of magnetic rigid bodies, movably disposed in said race, said magnetic rigid bodies being disposed between said non-magnetic rigid bodies; and
    a cover member coupled to said main body to cover said race.

3. The self-compensating dynamic balancer according to claim 2, wherein said magnetic rigid bodies and said non-magnetic rigid bodies are arranged in alternating fashion in said race, thereby removing mutual magnetic effects between said moving members.

\* \* \* \* \*